US009425608B2

(12) United States Patent
Kleczewski et al.

(10) Patent No.: US 9,425,608 B2
(45) Date of Patent: Aug. 23, 2016

(54) OVERVOLTAGE PROTECTION SYSTEM AND METHOD

(75) Inventors: Michael R. Kleczewski, Cleveland, WI (US); Awadhesh K. Thakur, Kohler, WI (US)

(73) Assignee: Kohler Co., Kohler, WI (US)

( * ) Notice: Subject to any disclaimer, the term of this patent is extended or adjusted under 35 U.S.C. 154(b) by 1034 days.

(21) Appl. No.: 13/331,857

(22) Filed: Dec. 20, 2011

(65) Prior Publication Data

US 2013/0154546 A1    Jun. 20, 2013

(51) Int. Cl.
| | |
|---|---|
| *H02J 7/00* | (2006.01) |
| *H02H 3/20* | (2006.01) |
| *H02J 7/24* | (2006.01) |
| *H02J 7/16* | (2006.01) |
| *H02J 7/14* | (2006.01) |

(52) U.S. Cl.
CPC .............. *H02H 3/202* (2013.01); *H02J 7/0029* (2013.01); *H02J 7/1492* (2013.01); *H02J 7/166* (2013.01); *H02J 7/244* (2013.01); *H02J 7/247* (2013.01); *Y02T 10/92* (2013.01)

(58) Field of Classification Search
CPC ......... H02J 7/1492; H02J 7/166; H02J 7/244; H02J 7/247; H02J 7/0029; H02H 3/202; Y02T 10/92
USPC .................................................. 320/107, 134
See application file for complete search history.

(56) References Cited

U.S. PATENT DOCUMENTS

| | | | | |
|---|---|---|---|---|
| 3,138,751 A | * | 6/1964 | Brewster | H02J 7/244 320/123 |
| 3,723,817 A | * | 3/1973 | Leonard | H02J 7/244 320/123 |
| 3,760,259 A | | 9/1973 | Tharman | |
| 3,781,631 A | | 12/1973 | Nelson et al. | |
| 3,781,651 A | | 12/1973 | Heidel | |

(Continued)

FOREIGN PATENT DOCUMENTS

| | | |
|---|---|---|
| CN | 101207276 A | 6/2008 |
| EP | 1304788 A1 | 4/2003 |

(Continued)

OTHER PUBLICATIONS

EP Patent Application No. 12007852.2; Extended European Search Report; Apr. 5, 2013; 6 pages.

(Continued)

*Primary Examiner* — Nathaniel Pelton
(74) *Attorney, Agent, or Firm* — Whyte Hirschboeck Dudek S.C.

(57) ABSTRACT

An electrical system for use with an alternator that supplies electrical power, an internal combustion engine including such an electrical system, and related methods of operation are disclosed. In one example embodiment, such an electrical system includes a first circuit portion configured to govern whether the power is communicated from the alternator system to a terminal associated with a battery and/or a load, and a second circuit portion configured to determine whether a voltage is elevated above a predetermined threshold and to provide a first signal upon determining that the voltage is so elevated. The electrical system also includes a third circuit portion coupled at least indirectly to the other two circuit portions. The third circuit portion is configured to provide a second signal upon receiving the first signal, the second signal being configured to cause the first circuit portion to cease allowing communication of the power to the terminal.

20 Claims, 8 Drawing Sheets

(56) References Cited

U.S. PATENT DOCUMENTS

| | | | |
|---|---|---|---|
| 3,828,750 A | | 8/1974 | Schuette et al. |
| 3,857,082 A | | 12/1974 | van Opijnen |
| 4,041,363 A | * | 8/1977 | Scheidler ............... H02J 7/166 320/123 |
| 4,177,415 A | | 12/1979 | Yukawa |
| 4,220,909 A | | 9/1980 | Piteo |
| 4,224,562 A | * | 9/1980 | Scheidler ............... H02J 7/244 322/26 |
| 4,247,813 A | | 1/1981 | Gansert et al. |
| 4,280,161 A | | 7/1981 | Kuhn et al. |
| 4,342,955 A | * | 8/1982 | Gant ................................ 322/25 |
| 4,401,936 A | | 8/1983 | van Opijnen |
| 4,405,892 A | | 9/1983 | Staerzl |
| 4,455,585 A | | 6/1984 | Murari et al. |
| 4,458,195 A | | 7/1984 | Piteo |
| 4,659,978 A | | 4/1987 | Dogadko |
| 4,723,079 A | | 2/1988 | Norton |
| 4,852,540 A | | 8/1989 | Safranek |
| 4,958,119 A | | 9/1990 | Fitzner |
| 5,039,931 A | | 8/1991 | Wieland |
| 5,079,496 A | | 1/1992 | Pierret et al. |
| 5,130,883 A | | 7/1992 | Edwards |
| 5,202,811 A | | 4/1993 | Minks |
| 5,463,521 A | | 10/1995 | Love |
| 5,504,413 A | | 4/1996 | Fernandez et al. |
| 5,642,033 A | | 6/1997 | Bartol et al. |
| 5,646,462 A | | 7/1997 | Cortes et al. |
| 5,780,995 A | | 7/1998 | Maggioni et al. |
| 5,895,338 A | | 4/1999 | Dins et al. |
| 5,917,250 A | | 6/1999 | Kakalec et al. |
| 6,088,207 A | | 7/2000 | Sugiura et al. |
| 6,288,881 B1 | | 9/2001 | Melvin et al. |
| 6,670,724 B2 | | 12/2003 | Ely et al. |
| 6,734,652 B1 | | 5/2004 | Smith |
| 6,784,635 B2 | | 8/2004 | Larson |
| 6,924,621 B2 | | 8/2005 | Jabaji et al. |
| 7,834,603 B2 | | 11/2010 | Mangtani et al. |
| 2007/0182248 A1 | | 8/2007 | Blaker et al. |
| 2009/0039832 A1 | * | 2/2009 | Cobianu et al. ............... 320/134 |
| 2009/0268364 A1 | * | 10/2009 | Trautman ...................... 361/111 |
| 2010/0327817 A1 | * | 12/2010 | Tabuta .................. H01M 10/44 320/148 |

FOREIGN PATENT DOCUMENTS

| | | | |
|---|---|---|---|
| GB | 2103896 A | | 2/1983 |
| WO | WO2009099144 | * | 8/2009 |

OTHER PUBLICATIONS

First Office Action for Chinese patent application No. 201210531693.8 dated Dec. 12, 2014, 15 pages.

Chinese Office Action and English translation for Chinese Patent Application No. 201210531693.8 dated Oct. 20, 2015, 4 pages.

Third office action for Chinese patent application No. 201210531693.8 dated Apr. 19, 2016, 6 pages.

* cited by examiner

OVERVOLTAGE PROTECTION SYSTEM AND METHOD

CROSS-REFERENCE TO RELATED APPLICATIONS

Field of the Invention

The present invention relates to electrical systems and related methods associated with internal combustion engines and, more particularly, to systems and methods for protecting against excessive voltages that may occur in such electrical systems.

BACKGROUND OF THE INVENTION

Internal combustion engines commonly have engine-driven alternators by which normal powered operation of the engine results in the generation of electricity that can be used both to charge a battery associated with the engine (e.g., the battery relied upon to start the engine) and also to power various electrical devices.

Notwithstanding the ubiquity of such engines equipped with alternators and the efficacy of using alternators in such engines, various problems continue to exist with the usage of such alternators. In particular, there can occur excessive voltage conditions or overvoltage transients that occur during operation of alternators, for example, due to transient conditions associated with alternator operation or arising from external sources (that is, sources other than the engines on which the alternators are operating). When such excessive voltage conditions occur, the excessive voltages that are applied to the battery and/or other electrical system components of the engine can disrupt operation of those devices and/or damage those devices. Indeed, adverse conditions such as an open line on a battery or due to improper grounding can provide alternator voltage to be applied directly to all existing electrical and electronic components connected to the shared power line. Such conditions can potentially lead to electrical damage as alternator voltage pulses provide a high repetitive energy not readily handled by other protection devices.

Although various techniques have been developed to minimize or eliminate the negative effects associated with such excessive voltage conditions, such existing techniques have corresponding disadvantages. In particular, shunting of charging current from alternator and shorting alternator terminals have been used to achieve over voltage protection and voltage regulation. Yet shorting out one or more stator windings of an alternator to achieve voltage regulation or to protect an electrical system from overvoltage conditions has several disadvantages. Alternator windings can overheat due to the short circuit conditions, since under those operational conditions large amounts of current flow through the alternator windings can occur. Voltage regulation using the shunting principle takes out the excess alternator current to common ground which may cause over heating of electronic components, and can necessitate a redesign to handle the additional load and heating. Another disadvantage is that the AC signal from the alternator can be lost during this regulation process due to shorting of the alternator terminals. In many applications alternator AC signal provides energy to loads like headlights, hand warmers and works as source of pulse for a tachometer circuit, and thus the loss of the AC signal from the alternator can preclude or limit desired operation of such electrical devices.

For at least these reasons, therefore, it would be advantageous if an improved system (or apparatus or device) and/or method for providing overvoltage protection with respect to batteries and/or other electrical components associated with engines having engine-driven alternators could be developed that avoided one or more of the disadvantages associated with conventional systems and methods such as those mentioned above and/or provided one or more other benefits.

BRIEF SUMMARY OF THE INVENTION

In at least some embodiments, the present invention relates to a smart battery charging system that uses an engine driven alternator to provide charging current to a battery (e.g., a 12 volt battery or also possibly for example a 6 volt or 24 volt battery) in a controlled format. The system provides overvoltage protection for any device connected to the battery power line from the alternator signal when set limits are exceeded. Additionally, the design provides a unique timed automatic reset of the system based on the latest signal information which allows for the charging operation to resume once the transient signal is no longer active.

Further, in at least some embodiments, the system includes an overvoltage protection circuit that protects any electrical or electronic components connected to the battery power line or the charging system by shutting OFF the charging signal and isolating the alternator completely from the system in the event of a defined over voltage condition. The circuit automatically resets to resume charging operation after a predetermined time delay while continuously monitoring for any overvoltage event. In at least some such embodiments, the overvoltage protection system is incorporated on rectifier regulator designs along with diagnostics indicators. Also, in at least some embodiments, the overvoltage protection system can be easily incorporated in relation to rectifier-regulators using either a half or full wave rectification configuration.

Additionally, in at least some embodiments, an electrical system for use with an alternator system that supplies electrical power includes a first circuit portion configured to govern whether the electrical power is communicated from the alternator system to a terminal associated with one or both of a battery and a load, and a second circuit portion configured to determine whether a voltage is elevated above a predetermined threshold and to provide a first signal upon determining that the voltage is elevated above the predetermined threshold, where the voltage is either a first voltage at the terminal or a second voltage based at least indirectly upon the first voltage. The electrical system also includes a third circuit portion coupled at least indirectly to each of the first and second circuit portions, where the third circuit portion is configured to provide a second signal for receipt by the first circuit portion upon receiving the first signal from the second circuit portion, and where the second signal is additionally configured to cause the first circuit portion to cease allowing communication of the electrical power to the terminal.

Further, in at least some embodiments, a method of operating an electrical system of an engine having an alternator system that is configured to supply alternating current (AC) power to a remainder of the electrical system includes rectifying the AC power supplied by the alternator system and communicating the rectified AC power to a terminal at which are coupled one or both of a battery and a load. The method additionally includes experiencing an overvoltage event at which a first voltage exceeds a threshold, where the first voltage is either a terminal voltage at the terminal or an other voltage based at least indirectly upon the terminal voltage, and causing the communicating of the rectified AC power to the terminal to cease, at least partly in response to the experiencing of the overvoltage event. The method also includes delaying a reestablishment of the communicating of the rectified AC power to the terminal until at least a predetermined time period has elapsed since the overvoltage event.

Additionally, in at least some embodiments, an internal combustion engine includes an alternator system that is configured to generate alternating current (AC) power during operation of the engine, and a terminal to which is coupled one or both of a battery and a load. The internal combustion engine further includes an electrical system including means for temporarily decoupling the terminal from the alternator system so as to prevent further supplying of the AC power from the alternator system to the terminal when an overvoltage event is experienced and for at least a predetermined time period subsequent to the overvoltage event.

Many other aspects and embodiments are also contemplated and considered within the scope of the invention.

BRIEF DESCRIPTION OF THE DRAWINGS

Embodiments of the invention are disclosed with reference to the accompanying drawings. It should be understood that the embodiments shown in the drawings are provided for illustrative purposes only, and that the present invention is not limited in its application or scope to the details of construction or the arrangements of components particularly illustrated in these drawings.

DETAILED DESCRIPTION OF THE PREFERRED EMBODIMENTS

Figure 1:
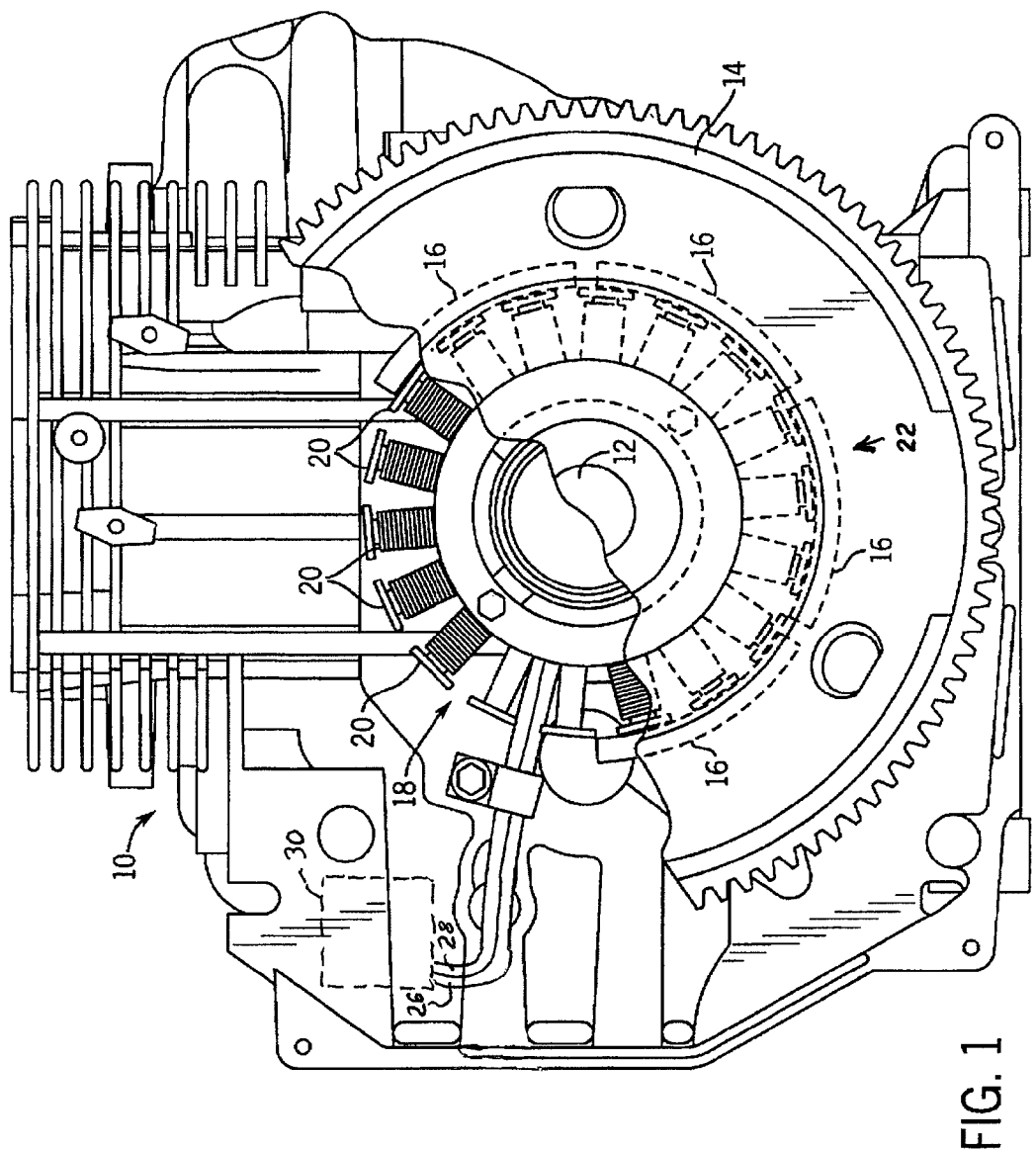
FIG. 1 is a schematic diagram showing a portion of an internal combustion engine including an alternator system with a stator and rotor (shown partially in cross-section), and further showing in phantom additional electrical components that in at least the present embodiment include a battery and a load as well as additional circuitry that can include rectification and overvoltage protection circuitry.

Referring particularly to FIG. 1, an internal combustion engine 10 rotates a shaft 12 that can be coupled to rotate one or more wheels, to operate an implement such as a mower blade or the like (not shown in the drawings), or to deliver rotational power to other components and/or for other purposes. A flywheel 14 mounts to the shaft 12, and as shown the flywheel supports a ring of permanent magnets 16 that encircle the shaft 12 and face radially inward. Additionally, a stator assembly 18 is mounted to the engine 10 and is positioned in the same plane as the magnets 16. In the present embodiment, the stator assembly 18 includes eighteen separate coils 20 that are disposed in a circle around the shaft 12 and spaced equidistantly apart. The coils 20 are connected in series and form a single stator winding. The coils 20 of the stator assembly 18 can also be formed so as to surround or wrap around laminations (e.g., E-shaped laminations) that form a core (or multiple core portions) of the stator assembly.

When the engine 10 is operating, the shaft 12 rotates the magnets 16 around the stationary stator assembly 18. An AC current is induced in the stator winding by its interaction with the changing magnetic field produced by the rotating magnets. As is well known in the art, this same interaction which generates the current in the stator winding also produces a torque on the shaft 12 which opposes its rotary motion. The greater the generated current, the greater this opposing torque. Current (and voltage) generated by relative motion of the coils 20 of the stator assembly 18 relative to the magnets 16 can be output by way of one or more (typically two or more) output lines 26, 28 and provided to one or more additional electrical components 30 as described in further detail with respect to FIGS. 2-5. The combination of the stator assembly 18 with the coils 20 and the permanent magnets 16 (as well as the output lines 26 and 28) can be considered to be an engine-driven alternator system 22.

Notwithstanding the above description, the present invention is intended to encompass numerous variations of engine-driven alternator systems, engines, and engine components. For example, in some other embodiments, the alternator system is arranged such that the coils of the stator assembly are mounted concentrically around the magnets, which are positioned along an outer rim of the flywheel or another rotating engine component. Also for example, in some embodiments, the engine 10 (or other engines compassed herein) can be an engine from the Courage family of vertical and/or horizontal crankshaft engines available from the Kohler Company of Kohler, Wis. Also, in at least some embodiments, the engine 10 can be any of a variety of SORE engines including Class 1 and Class 2 small off-road engines (SORE) such as those implemented in various machinery and vehicles, including, for example, lawn movers, air compressors, and the like.

Indeed, in at least some such embodiments, the engine(s) can be "non-road engines" as defined in 40 C.F.R. §90.3, which states in pertinent part as follows: "Non-road engine means . . . any internal combustion engine: (i) in or on a piece of equipment that is self-propelled or serves a dual purpose by both propelling itself and performing another function (such as garden tractors, off-highway mobile cranes, and bulldozers); or (ii) in or on a piece of equipment that is intended to be propelled while performing its function (such as lawnmowers and string trimmers); or (iii) that, by itself or in or on a piece of equipment, is portable or transportable, meaning designed to be and capable of being carried or moved from one location to another. Indicia of transportability include, but are not limited to, wheels, skids, carrying handles, dolly, trailer, or platform."

Figure 2:
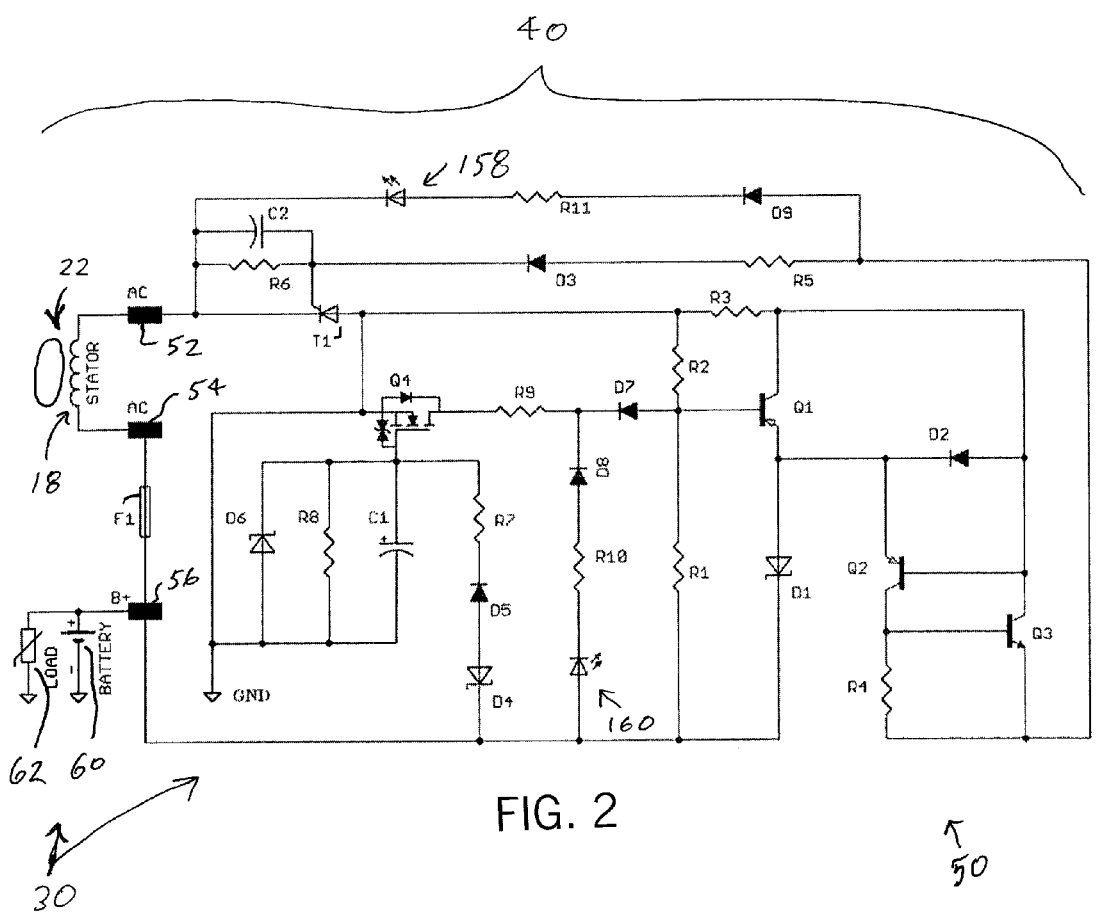
FIG. 2 is an electrical schematic diagram showing in more detail the alternator system and also the additional electrical components including the battery, load, and additional circuitry of FIG. 1.

Turning to FIG. 2, an electrical schematic diagram shows components of an example electrical system 40 associated with the engine 10 (and/or a vehicle or other machine with which the engine itself is associated). The electrical system 40 includes each of the alternator system 22 of the engine and the additional electrical components 30 associated with the engine. More particularly, in the present embodiment, the additional electrical components 30 include each of a battery 60 associated with the engine, a load 62 also associated with the engine, and additional circuitry 50. As discussed in further detail below with respect to FIGS. 3-5, the additional circuitry 50 includes portions that serve as a rectifier regulator section as well as an overvoltage protection section, among other things.

As shown, the additional circuitry 50 is connected to the stator assembly 18 of the alternator system 22 at first and second AC terminals 52 and 54 of the electrical system 40 (the terminals themselves can be considered part of the additional circuitry 50). Further as shown, the additional circuitry 50 is additionally coupled, by way of a B+ line or battery terminal 56 (which also can be considered part of the additional circuitry 50) that is linked to the second AC terminal 54 by way of a fuse F1, to the battery 60 and the load 62. As shown, in the present embodiment the battery 60 and the load 62 are coupled in parallel with one another between the battery terminal 56 and ground (represented by ground or triangle symbol). The battery 60 can be for example a 12 Volt DC battery or alternatively a 6 Volt DC or 24 Volt DC battery that is employed to power a starter (not shown) of the engine 10. The load 62 is intended to be representative of any one or more of a variety of electrical components associated with the engine 10 and/or possibly a vehicle or other system of which the engine is a part (or is otherwise associated) that are powered by one or both of the battery 60 and the alternator system 22. From FIG. 2, it should be apparent that the battery 60 and load 62 are coupled to, and receive power from, the alternator system 22 by way of the additional circuitry 50.

Figure 3:
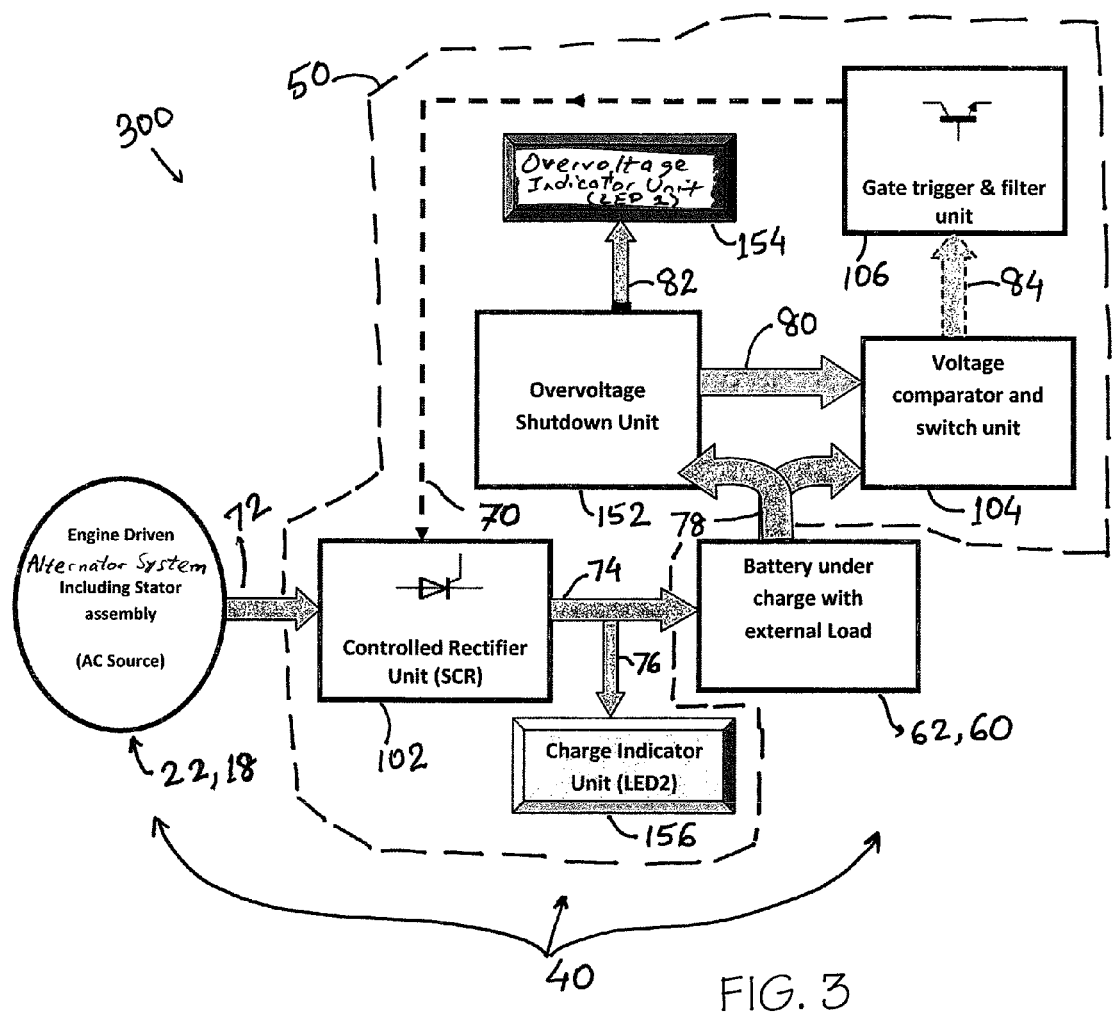
FIG. 3 is a further schematic diagram illustrating in a conceptual manner various subportions of the additional circuitry as well as the alternator system, battery, and load of FIGS. 1 and 2 and illustrating how those components interact with one another.

Referring to FIG. 3, the electrical system 40, including the battery 60, load 62 and alternating system 22 (including the starter assembly 18) constituting the AC source of power for the system 40 is shown in a schematic manner to highlight particular sub-portions of the additional circuitry 50 and their functional interrelationships relative to one another and relative to the battery, load, and alternating system. Example electrical components corresponding to the sub-portions of the additional circuitry 50 are then further shown in more detail and described with respect to FIGS. 4 and 5.

As shown in FIG. 3, the additional circuitry 50 includes six functional sub-portions or functional units namely, first, second, third, fourth, fifth, and sixth functional units 102, 104, 106, 152, 154, and 156, respectively. In the present embodiment, the first functional unit 102 more particularly is a controlled rectifier unit that governs current (and thus power) flow between the alternator system 22 and one or both of the battery 60 and load 62 that are coupled in parallel with one another. Power flow from the alternator system 22 to the controlled rectifier unit or first functional unit 102 is represented by an arrow 72, while power flow from the first functional unit to the battery 60 and load 62 is represented by an arrow 74. Operation of the first functional unit 102 is governed by other sub-portions of the additional circuitry 50 as will be described in further detail below and as is represented by a dashed arrow 70.

Further as illustrated, when power is being provided to the battery 60 and the load 62 by way of the first functional unit 102, the sixth functional unit 156, which is a charge indicator unit, provides an output signal that is indicative of the charging or power flow that is occurring. In the present environment, the sixth functional unit 156 particularly employs a light emitting diode (LED) for this purpose. However, in other embodiments, other types of indicators can be utilized including, for example, an acoustic indicator such as a beeping device (beeping could occur either charging is occurring or when the charging is not occurring).

Additionally in the present embodiment, during operation, the voltage at the battery terminal 56 ($V_b$) shown in FIG. 2 is monitored by each of the second functional unit 104, which operates as a voltage comparator and switch unit, and the fourth functional unit 152, which serves as an overvoltage shutdown unit. This monitoring is represented in FIG. 3 by a double-headed arrow 78 extending from the battery 60/load 62 to each of the second functional unit 104 and the overvoltage shutdown unit 152. Further, as represented by an arrow 84, operation of the second functional unit 104 can control or influence operation of the third functional unit 106, which is a gate trigger and filter unit. More particularly, as will be discussed further below, depending upon whether the voltage ($V_b$) at the battery terminal 56 is higher or lower (e.g., whether it is above or below a particular threshold), a signal or signals represented by the arrow 84 are generated by the second functional unit 104 that in turn affect operation of the third functional unit 106.

More particularly, the signal(s) generated by the second functional unit 104 cause (or are configured to cause) the third functional unit 106 to operate in a manner so as to itself provide or not provide an appropriate signal or signals to the first functional unit 102 (and particularly to a silicon-controlled rectifier or SCR thereof) as represented by the dashed arrow 70. Those signal(s) represented by the dashed arrow 70 and provided to the first functional unit 102 particularly cause, or are configured to cause, the first functional unit to turn ON, stay ON, turn OFF, or stay OFF such that power begins or continues to flow between the alternate system 22 and the battery 60/load 62, or ceases to flow or continues not to flow. Additionally as indicated, the third functional unit 106 also includes a filter portion to filter out noise and the like as described further below.

As already mentioned, the fourth functional unit 152 also monitors the voltage level of the battery 60/load 62 (also constituting the battery terminal 56 ($V_b$)) as represented by the double-headed arrow 78. More particularly in this regard, the fourth functional unit (overvoltage shutdown unit) 152 determines based upon the battery terminal 56 ($V_b$)) whether or not an overvoltage condition has occurred. As represented by the arrow 80, if the fourth functional unit 152 determines that an overvoltage condition has occurred, the fourth functional unit sends signal(s) to the second functional unit 104 that cause portions of the additional circuitry 50 to shut down. More particularly in this regard, upon receiving such signals(s), the second functional unit 104 can again generate signal(s) that are provided to the third functional unit 106 that in turn provides signal(s) to the first functional unit 102 that are configured to cause the communication of power between the alternator system 22 and the battery 60/load 62 to cease.

Further as represented by an arrow 82, the overvoltage shutdown unit constituting the fourth functional unit 152 is also in communication with the fifth functional unit 154 that serves as an overvoltage indicator unit. When the fourth functional unit 152 detects that an overvoltage condition has occurred resulting in system shut down, the fourth functional unit 152 additionally sends signal(s) to the fifth functional unit 154 that cause the fifth functional unit to provide an output signal indicative of that fact. As with the sixth functional unit 156, the fifth functional unit 154 in the present embodiment employs a light emitting diode (LED) although in other embodiments other indicators can be used. Finally, as will be discussed in further detail below, in the present embodiment the fourth functional unit 152 not only detects overvoltage conditions and provides signal(s) in response thereto, but also includes a time delay function according to which the fourth functional unit 152 itself determines whether sufficient time has elapsed subsequent to the occurrence of an overvoltage event, and does not provide signals to the second functional unit 104 or the fifth functional unit 154 that precipitate a resumption of normal operation until after that time has elapsed. Once sufficient time elapses, however, signals are provided to each of the second functional unit 104 and the fifth functional unit 154, as again represented by the arrows 80 and 82, respectively, to resume normal operation.

Figure 4:
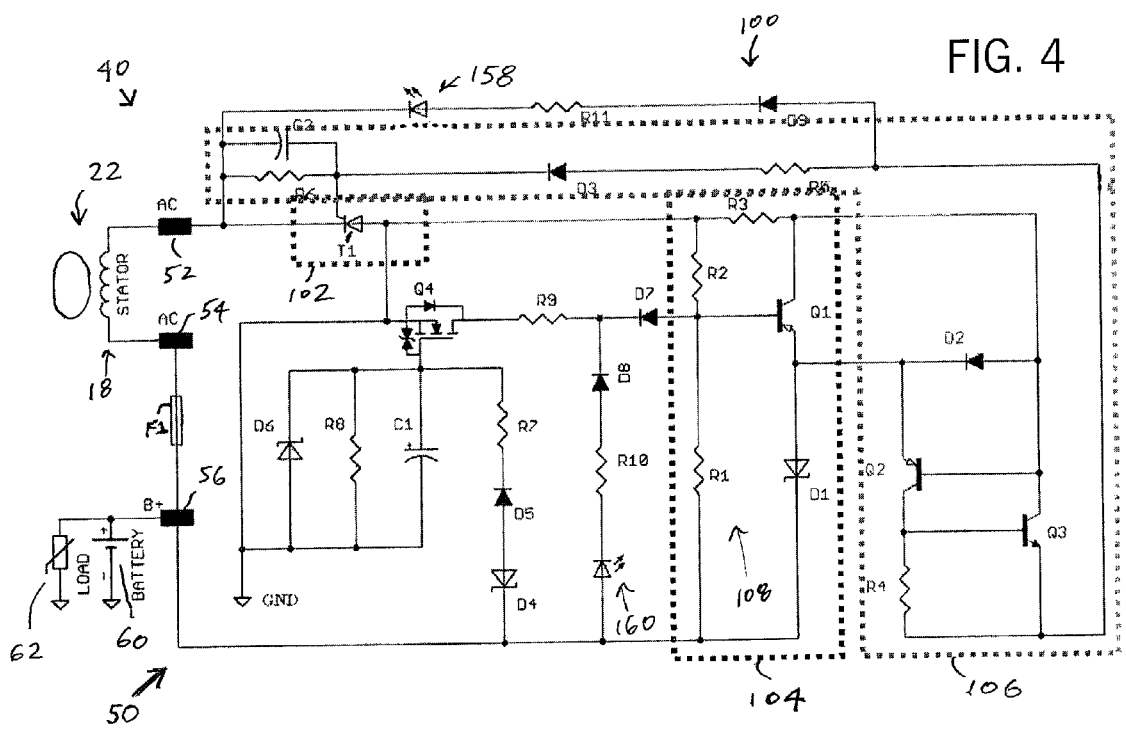
FIGS. 4 and 5 are additional electronic schematic diagrams identical to those of FIG. 2 except insofar certain portions of the additional circuitry corresponding to certain of the subportions shown in FIG. 3 are highlighted.
Figure 5:
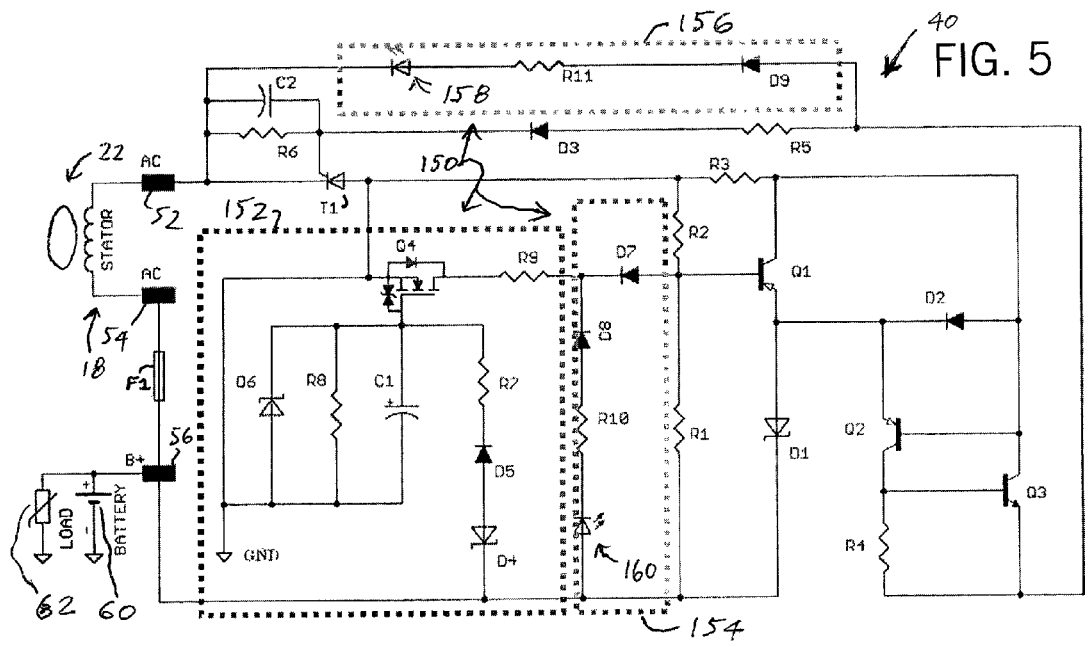

Referring additionally to FIGS. 4 and 5, respectively, the electrical system 40 is again shown with certain sub-portions of the additional circuitry 50 highlighted in each case that correspond to different ones of the functional units 102, 104, 106, 152, 154, and 156 already discussed above in relation to FIG. 3. FIG. 4 particularly highlights circuit components of the additional circuitry 50 that correspond to the first, second, and third functional units 102, 104, and 106, respectively, and that together with the sixth functional unit 156 of FIG. 5 serve overall as a rectifier regulator portion 100 of the additional circuitry 50, while FIG. 5 particularly highlights circuit components of the additional circuitry 50 that correspond to the fourth and fifth functional units 152 and 154, respectively, and that serve overall as an overvoltage protection portion 150 of the additional circuitry 50 (again, the sixth functional unit 156 of FIG. 5 is more properly considered part of the rectifier regulator portion 100).

Referring then more particularly to FIG. 4, the first functional unit 102 includes a silicon-controlled rectifier (SCR) T1 that serves to provide a link between the alternator system 22 (that is, the engine-driven alternator with multi-pole stator assembly 18 and permanent magnet based flywheel) and the battery 60 and the load 62 by which power can be delivered from the alternator system 22 the battery and/or load. As shown, in the present embodiment the anode (or anode pin) of the SCR T1 connects to ground while the cathode (or cathode pin) connects to the first AC terminal 52 that is coupled to one side of the stator assembly 18. Also as shown, the other side of the stator assembly 18 is coupled to the second AC terminal 54 that in turn is connected directly to the battery terminal 56 via the fuse F1, where the battery 60 and load 62 are both coupled between the battery terminal and ground. The gate of the SCR T1 is controlled by the third functional unit 106 that in turn is controlled by the second functional unit 104. More particularly, the gate of the SCR T1 is triggered by current as provided by the third functional unit 106. By virtue of this control, the SCR T1 is conductive during one half or phase of the stator AC signal and at such time (absent an overvoltage condition) serves to charge the battery 60 by passing current through it. Although in the present embodiment the functional units 106, 104, and 102 (with the SCR T1) provide a half-wave rectifier regulator circuit, in other embodiments this circuitry can be modified to operate as another type of rectifier regulator (e.g., a full-wave rectifier regulator).

Also as shown in FIG. 4, the second functional unit 104 includes a comparator in the form of a first bipolar junction transistor that in this case is a PNP transistor Q1, a voltage divider 108 including a first resistor R1 and a second resistor R2, a first diode D1 that is a reference Zener diode, and a third resistor R3. As shown, the third resistor R3 is connected between the collector of the PNP transistor Q1 and the second resistor R2, the second resistor is connected between the third resistor R3 and the base of the PNP transistor Q1, the junction between the second and third resistors R2 and R3 is also coupled to ground, the first resistor R1 is connected between the base of the PNP transistor Q1 (and thus the second resistor R2) and battery terminal 56, and the first (Zener) diode D1 is connected between the emitter of the PNP transistor Q1 and the battery terminal as well, with the cathode of the first diode D1 particularly being coupled to the battery terminal and the anode of that diode being coupled to the emitter of the PNP transistor Q1. Thus, the voltage at the battery terminal 56 ($V_b$) is sensed and compared to a reference voltage (set by the Zener diode D1), which turns the PNP transistor Q1 ON and OFF based on the charge level (change in voltage) at the battery 60.

The PNP transistor Q1 at the same time controls the third functional unit 106. As shown, the third functional unit 106 includes second and third diodes D2 and D3, respectively, a second bipolar junction transistor that is a PNP transistor Q2, a third bipolar junction transistor that is a NPN transistor Q3, a capacitor C2, and fourth, fifth, and sixth resistors R4, R5, and R6, respectively. More particularly, the emitter of the PNP transistor Q2 of the third functional unit 106 is coupled to the emitter of the PNP transistor Q1 of the second functional unit 104 (and thus also to the Zener diode D1), and also coupled to the cathode of the second diode D2. The anode of the second diode D2 is coupled to each of the base of the PNP transistor Q2, the collector of the NPN transistor Q3, and the collector of the PNP transistor Q1 of the second functional unit 104 (and thus also to the third resistor R3). Further, the fourth resistor R4 in turn is coupled between, at one of its end terminals, each of the base of the NPN transistor Q3 and the collector of the PNP transistor Q2 and, at its other end terminal, each of the emitter of the NPN transistor 3 and one end of the fifth resistor R5, the other end of which is coupled to the anode of the third diode D3. Additionally, each of the capacitor C2 and the sixth resistor R6 are coupled in parallel with one another between the first AC terminal 52 and the cathode of the third diode D3, which also is coupled to the gate of the SCR T1 of the first functional unit 102.

Given this design, the third functional unit 106 includes not only transistors but also a current control resistor as well as a noise filter unit. More particularly, when the PNP transistor Q1 of the second functional unit 104 is ON, current triggers the base of the PNP transistor Q2, which then turns it ON, thereby triggering the base of the NPN transistor Q3. When this occurs, the third functional unit 106 provides sufficient trigger current necessary to trigger the gate of the SCR T1. The combination of the sixth resistor R6 and capacitor C2 additionally provides immunity from high frequency noise, thereby preventing any undesired triggering of the SCR T1. Thus, the third functional unit 106 creates a thyristor equivalent gate trigger circuit for the SCR T1 along with a low pass filter unit. In this regard, the third functional unit 106 is advantageous relative to at least some other conventional designs for SCR gate trigger circuits, as it provides biasing of the gate of the SCR T1 using a RC filter (e.g., the sixth resistor R6 and capacitor C2) to provide immunity from high frequency noise and reduces turn-off time. This feature also provides the ability to choose trigger frequency and adjust the level of gate sensitivity.

Referring now more particularly to FIG. 5, the sixth functional unit 156 includes simply the series combination of a ninth diode D9, a light emitting diode (LED) 158, and an eleventh resistor R11, where the resistor is coupled in series between the anode of the LED and the cathode of the diode D9, the cathode of the LED is coupled to the first AC terminal 52 (and thus to each of the capacitor C2, the resistor R6, and the cathode of the SCR T1), and the anode of the diode D9 is coupled to the emitter of the NPN transistor Q3 of the third functional unit 106 (and thus also to the fourth resistor R4 and the fifth resistor R5 of that functional unit). With this configuration, the sixth functional unit 156 serves as a charging indicator that can constitute part of an overall (engine) diagnostics system. More particularly, in the present embodiment, the LED 158 glows continuously when normal battery charging operation is occurring. That is, when the PNP transistor Q1 is ON, it activates the third functional unit 106, which in turn triggers conduction by the SCR T1 and thus allows for power to be supplied, to the battery 60. When this occurs, the sixth functional unit 156 (normal charging indicator) also gets current from the NPN transistor Q3, which completes the circuit to ground via the SCR T1. The ninth diode D9 additionally prevents the additional circuitry 50 from encountering reverse battery polarity connections and the eleventh resistor R11 limits the current in the circuit as required by the LED 158. In short, when the battery 60 receives charge current when the SCR T1 turns ON during the positive half of the AC signal from the alternator system 22, the circuit for the LED 158 is completed via the SCR T1 activation.

Further referring to FIG. 4, the fourth functional unit 152 provides an overvoltage protection circuit/overvoltage shutdown unit that shuts OFF the charging operation of the rectifier regulator (formed by the first, second, and third functional units 102, 104, and 106) in the event of any overvoltage condition including, for example, an adverse condition such as a battery disconnect, an alternator or engine malfunction, or an external load switching condition that is placed on the associated system (e.g., on the load 62). Additionally, the particular overvoltage protection circuit in the present embodiment provided by the fourth functional unit 152 not only affords overvoltage protection as mentioned above, but also affords an automatic reset to resume the charging operation with respect to the battery 60 after a predetermined time delay, while continuously monitoring for any (additional) overvoltage event or events.

More particularly as shown in FIG. 4, the fourth functional unit 152 includes two additional Zener diodes shown as a fourth diode D4 and a sixth diode D6, an additional general rectifier diode, namely, a fifth diode D5, three additional resistors shown as a seventh resistor R7, an eighth resistor R8, and a ninth resistor R9, a capacitor C1, and a N-Channel MOSFET Q4. The N-Channel MOSFET Q4 in the present embodiment is a voltage-controlled device rather than a current-controlled device, although current-controlled devices can be employed in alternate embodiments. Further as shown, each of the sixth diode D6, the eighth resistor R8, and the capacitor C1 are coupled in parallel between ground (shown as a ground terminal) and a gate of the N-Channel MOSFET Q4, with more specifically it being the anode of the sixth diode D6 that is coupled to ground (the cathode being coupled to the gate of the N-Channel MOSFET).

Also as illustrated, a source of the N-Channel MOSFET Q4 is further coupled directly to ground (as is the anode of the SCR T1 and the junction between the second and third resistors R2 and R3 of the second functional unit 104). Additionally, the seventh resistor R7, the fifth diode D5, and the fourth diode D4 are all coupled in series between the gate of the N-Channel MOSFET Q4 and the battery terminal 56, with the resistor R7 being coupled between the gate of the N-Channel MOSFET Q4 and the cathode of a fifth diode D5, the anode of the diode D5 being coupled to the anode of the (Zener) diode D4, and the cathode of the diode D4 being coupled to the battery terminal 56. Further, the resistor R9 of the fourth functional unit 152 is coupled between a drain of the N-Channel MOSFET Q4 and the cathode of a seventh diode D7 (which is shown as part of the fifth functional unit 154 even though it could be alternatively considered part of the fourth functional unit 152), the anode of which is coupled to the base of the PNP transistor Q1 (as well as to the first and second resistors R1 and R2).

Given this configuration, when an overvoltage event occurs, as identified when the signal voltage amplitude exceeds the voltage reference set by the fourth (Zener) diode D4 (again, for example, due to adverse conditions caused by inductive load switching or an open battery condition), then the fourth diode D4 goes into conduction mode and triggers the gate of the N-Channel MOSFET Q4 which turns it in ON state. The N-Channel MOSFET Q4 then provides a ground path to the base of the PNP transistor Q1 through the seventh diode D7 and the ninth resistor R9, thereby turning OFF the PNP transistor Q1 (which can be viewed as the "main" transistor of the additional circuitry 50). This removes the battery charging operation as provided from the rectified alternator signal, which is shut down. More particularly, when an overvoltage condition occurs, the fourth functional unit 152 disables the second functional unit 104 (particularly the PNP transistor Q1 thereof) and, due to the switching OFF of the PNP transistor Q1, no current flows through the third functional unit 106 that can trigger the SCR gate and this effectively causes triggering OFF of the SCR T1. Thus, the current path from the first AC terminal 52 to the battery terminal 56 via the SCR T1, the third resistor R3, and the PNP transistor Q1 is broken, which switches the alternator system 22 (and particularly the stator assembly 18) out of the system to an electrically isolated condition.

Also when an overvoltage condition occurs, a portion of the overvoltage pulse is used to charge the capacitor C1 through the seventh resistor R7. The voltage experienced across the capacitor C1 not only turns ON the N-Channel MOSFET Q4 but also keeps the N-Channel MOSFET Q4 in the ON state until the capacitor C1 discharges through the eighth resistor R8. Given proper selection of the resistance of the eighth resistor R8 and the capacitance of the capacitor C1, a high time constant value can be achieved for slow discharge. By virtue of such operation, the N-Channel MOSFET Q4 can be kept ON based on the chosen values of the capacitance of the capacitor C1 and resistance of the eighth resistor R8, that is, a RESET time during which the N-Channel MOSFET Q4 is kept ON prior to switching OFF can be adjusted to a pre-determined value as needed.

With respect to selecting the respective resistance and capacitance values of the eighth resistor R8 and the capacitor C1, charging and discharging of capacitor are exponential processes, Equation (1) as follows represents capacitor charging:

$$V_1C(t)=[V_1C(0)-V_1\text{IN}]*[e^{(-t/RC)}]+V_1\text{IN} \quad (1)$$

where $V_1C(t)$=capacitor voltage at any given time "t", $V_1C(0)$=capacitor voltage at "t=0", and $V_1\text{IN}$=applied input voltage (e.g., battery voltage). Given this equation, the rate of charge of the capacitor depends on the product of the resistance R of the resistor governing charging (in this case, the resistance of the resistor R7) and the capacitance of the capacitor being charged (in this case, the capacitance of the capacitor C1). This product is also referred as time constant which is usually denoted by the Greek letter "τ", where the unit of time of the time constant τ is seconds. According to equation (1), it takes about 2*τ seconds to charge the capacitor about 95% of the applied input voltage. So for faster charging of capacitor C1, the resistance of the resistor R7 should be chosen small.

As for discharging, equation (2) represents the capacitor discharging process (assuming that the capacitor discharges completely, where the final capacitor voltage after discharge=0V):

$$V_1C(t)=V_1C(0)*e^{(-t/RC)} \quad (2)$$

where $V_1C(t)$=capacitor voltage at any given time "t", and $V_1C(0)$=capacitor voltage at "t=0". As with the charging of the capacitor discussed above, the rate of discharge of the capacitor also depends on the product of the capacitance of that capacitor (again, in this case, the capacitance C1), but also the resistance of the resistor through which discharging occurs. In this case, the particular resistance involved is not the resistance of the resistor R7 but rather is the resistance of the resistor R8 by which discharging occurs. It should be noted that, by setting the resistance value of the resistor R7 to be much less than the resistance value of the resistor R8 (R7<<R8), this allows for faster charging of the capacitor C1 but slow discharging of that capacitor. Additionally, a RESET time can be controlled by controlling the product of R8 and C1. Per the discharge equation (2), it takes about $3*\tau$ seconds to discharge the capacitor C1 to 5% of its fully-charged voltage value and so a larger value of $\tau$ can provide higher RESET delay time for the overvoltage circuit.

Additionally for example, in this regard, assuming that the resistance value of resistor R7 is chosen to be 100Ω and the capacitance value of the capacitor C1 is chosen to be 10 μF, this will result in a time constant $\tau$ of 1 milliseconds (again where $\tau=R*C$). So it may take about 2 ms for the capacitor C1 to get charged up to 95% of the applied input voltage value. Alternatively, if we choose the resistance value of the resistor R8 as 500 kΩ and the capacitance value of the capacitor C1 to be 10 μF, the resulting time constant $\tau$ will be 5 seconds (again where $\tau=R*C$). So it may take about 15 seconds for the capacitor C1 to get discharged to 5% of its fully charged voltage value. Further as presented in FIG. 8, total discharge time or predetermined reset delay would increase when multiple overvoltage events occur (e.g., as represented by spikes 264 and 270 shown in FIG. 8 and discussed below).

Further as shown in FIG. 5, the fifth functional unit 154 includes two additional general rectifier diodes, namely, the seventh diode D7 already mentioned above as well as an eighth diode D8, plus a tenth resistor R10, and an additional light emitting diode (LED) 160, which like the LED 158 serves as an indicator light. As already mentioned, the anode of the seventh diode D7 is coupled to the base of PNP transistor Q1 (and thus also to the junction between the first and second resistors R1 and R2) of the second functional unit 104, and the cathode of the seventh diode D7 is coupled to the cathode of the eighth diode D8 as well as the terminal of the ninth resistor R9 that is opposite the terminal coupled to the drain of the N-Channel MOSFET Q4. Additionally, the tenth resistor R10 is coupled between the anode of the eighth diode D8 and the cathode of the LED 160, the anode of which is coupled to the battery terminal 56.

Given this arrangement, when the N-Channel MOSFET Q4 is in the ON (conductive) state, then the current from the battery (via the battery terminal 56) is routed to ground via the LED 160 and the ninth resistor R9 (as well as the tenth resistor R10 and the eighth diode D8). Thus, the combination of these circuit components serves as an overvoltage indicator unit. It should further be noted that the tenth resistor R10 limits the current in the fifth functional unit 154 to power up the LED 160 only when the overvoltage circuit is active. Further, the eighth diode D8 is incorporated to provide reverse polarity protection for the fifth functional unit 154.

The combination of the overvoltage protection portion 150 of the additional circuitry 50 (formed particularly by the fourth and fifth functional units 152 and 154) including the LED 160, along with the rectifier regulator portion 100 of the additional circuitry 50 (formed particularly by way of the first, second, third, and sixth functional units 102, 104, 106, and 156) with the LED 158, serves to provide diagnostic code outputs that can be read by an operator to determine whether the alternator/battery charging system is operating normally. In particular, Table 1 provides a summary of how different operational states of the LEDs 158 and 160 can be interpreted by an operator as indicative of a particular system status:

TABLE 1

Diagnostic codes for rectifier regulator with overvoltage and charging indicators.

| LED1 | LED2 | Result |
|------|------|--------|
| OFF | ON | Charging system working normally |
| ON | OFF | Over voltage event occurred and charging operation is OFF |
| OFF | OFF | Charging system is NOT working and in need of service. |
| ON | ON | Charging system is faulty and in need of service. |

Figure 6:
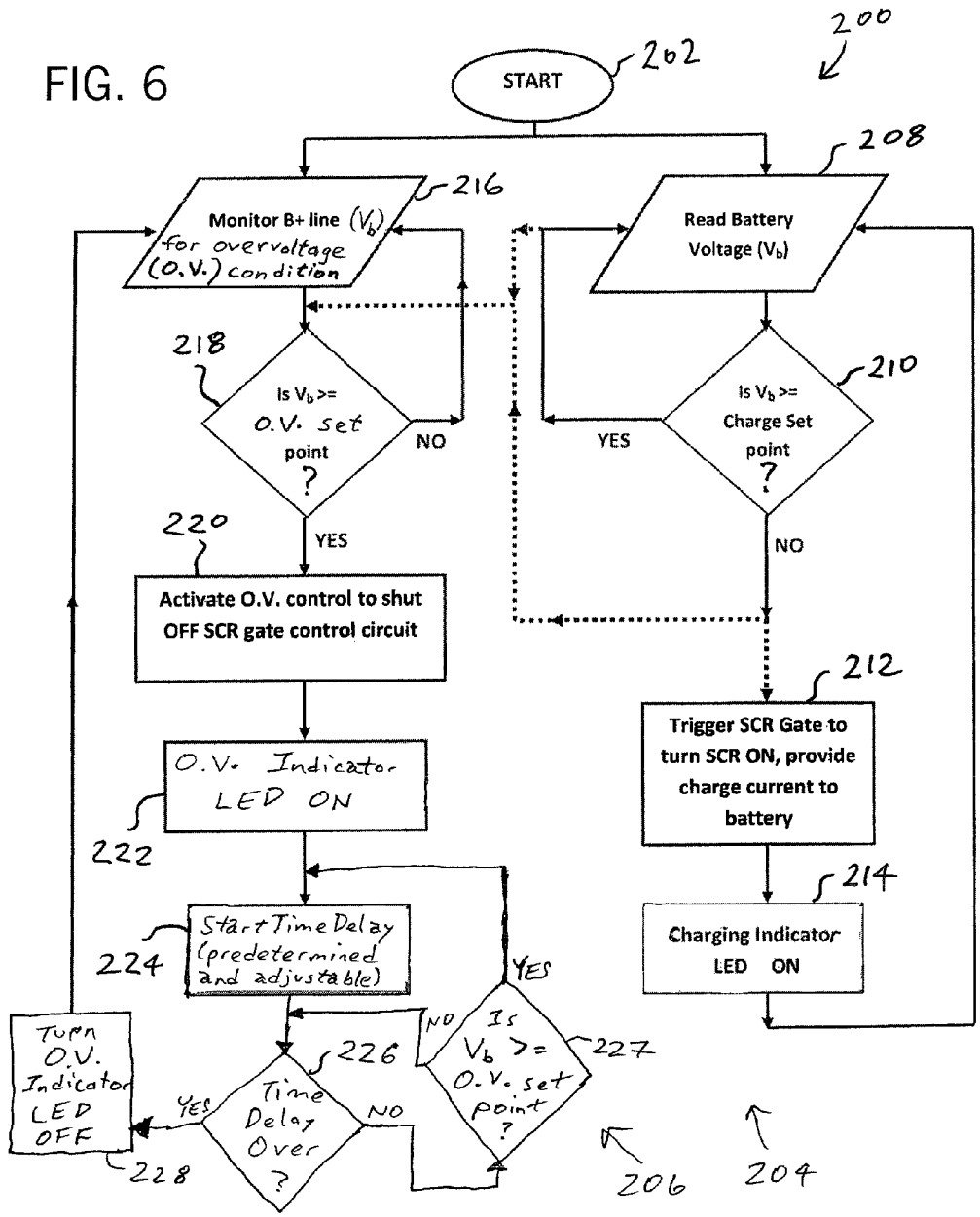
FIG. 6 is a flow chart illustrating example steps of operation of the additional circuitry of FIGS. 1-5 in relation to the alternator system, battery, and/or load.

Turning to FIG. 6, a flowchart 200 further illustrates operation of the system 40 and particularly the additional circuitry 50 thereof. As shown, upon the system 50 entering operation at a start step 202, first and second sub-processes 204 and 206, respectively, are performed continually and simultaneously. The first sub-process 204 begins, following the start step 202, at a step 208 in which the system 50 reads the voltage at the battery terminal 56 (or on the B+ line), namely, the battery voltage ($V_b$). Next, at a step 210, the system determines whether the battery voltage ($V_b$) is greater than or equal to a charge set point. The operation of the steps 208 and 210 can be understood to be performed by the second functional unit 104, which as already described provides a comparator in the form of the PNP transistor Q1, the voltage divider from the resistors R1 and R2, and the first (Zener) diode D1, and Which senses the battery voltage and compares it to the reference set by the diode D1 so as to govern the turning ON or OFF of the transistor Q1. Further as illustrated in FIG. 6, so long as the battery voltage ($V_b$) is greater than or equal to the voltage (battery charge) set point established, by the first diode D1, the process continually cycles back from the step 210 back to the step 208 and then back to the step 210.

However, if it is determined at the step 210 that the battery voltage ($V_b$) is less than the voltage (battery charge) set point, then the process advances to a step 212, at which the SCR T1 is triggered to turn on by way of a trigger signal applied to the gate of the SCR, at which time the SCR then provides for (or allows provision of) charge current to the battery 60 vis-à-vis battery terminal 56. This triggering of the SCR T1, of the first functional unit 102, is performed particularly by way of the third functional unit 106 (operating as the thyristor gate trigger circuit or SCR gate control circuit). Further as illustrated, once the SCR T1 is turned on so as to provide charge current to the battery 60, then the process also performs a step 214 at which the charging indicator LED, that is, the LED 158 of the sixth functional unit 156, is turned on so as to indicate that charging is taking place. The process then proceeds back to step 208 where battery voltage is again read.

As already noted, the sub-process 206 can occur concurrently with the sub-process 204. The sub-process 206, following the start step 202, begins at a step 216, at which the voltage at the battery terminal 56 (that is, the voltage on the line or the battery voltage ($V_b$)) is monitored for an overvoltage condition. Subsequent to the step 216, at a next step 218 the system determines whether the current value of the voltage at the battery terminal ($V_b$) is greater than or equal to an overvoltage set point as determined by the fourth (Zener) diode D4. Both of the steps 216 and 218 can be considered performed by the fourth functional unit 154 discussed above. If the voltage at the battery terminal 56 (again, the battery voltage ($V_b$)) is not greater than or equal to the overvoltage set point, then the process returns to the step 216 and the steps 216 and 218 are repeated again and again.

However, if the voltage at the battery terminal 56 is determined at the step 218 to be greater than or equal to the overvoltage set point, then instead the process advances to a step 220, at which the overvoltage control capability is activated and this ultimately results in the shutting OFF of the SCR, gate control circuit, the SCR T1. More particularly, as already described, once the fourth diode D4 begins to conduct due to an overvoltage event, the N-Channel MOSFET Q4 is triggered at its gate so as to enter the ON state. When this occurs, the N-Channel MOSFET Q4 provides a ground path to the base of the first transistor Q1, which results in the turning OFF of that first transistor Q1. This in turn causes the third functional unit 106 (the SCR gate control circuit) to shut down any battery charging operation that might otherwise have (or previously) been occurring due to conduction by the SCR T1. Additionally at a step 222, the overvoltage indicator LED (namely, the LED 160), is turned ON. Although this step is shown as being subsequent to the step 220, it can be considered to occur simultaneous as the step 220, occurring as soon as an overvoltage event occurs.

Further, as already discussed, the N-Channel MOSFET Q4 upon being turned on can remain on for a period of time as determined by the RC circuit formed by the combination of a capacitor C1 and the eighth resistor R8. Thus at a step 224 such a time delay is provided and the running of such time delay is started. It will be understood that, more particularly, the time delay starts once the overvoltage event has ended, after the charging of the capacitor C1 has ceased. Further as already discussed, the time delay is predetermined and adjustable based on the selection of the values for the eighth resistor R8 and capacitor C1.

Following the step 224, as represented by steps 226 and 227, the system continues to be in shut down mode due to the overvoltage event until the time delay is completed. More particularly, as long as the time delay is not over yet as determined at the step 226, the system continues to further monitor for whether yet another overvoltage event has occurred, at a step 227 (more particularly, by detecting whether the battery voltage is again greater than or equal to the overvoltage set point as was already detected at the step 218). If during the time delay period an additional overvoltage event occurs, then the process returns to the step 224 and the time delay is restarted. In this respect, it should be noted also that the time delay that is set in response to each different overvoltage event can be different, based upon the amount of charging of the capacitor C1 that results from that overvoltage event. Alternatively, further as shown in at the step 226, it the time delay period expires and no further additional overvoltage event has occurred, then the process advances to a step 228 at which the overvoltage indicator LED is turned off, and then the sub-process 206 returns to the step 216.

Finally it should also be noted as shown in FIG. 6 that the first and second sub-process 204 and 206 are linked. More particularly as shown, regardless of whether the determination at the step 210 of the sub-process 204 is in the affirmative (that is, the voltage ($V_b$) is greater than or equal to the charge set point) or in the negative (the voltage ($V_b$) is less than the charge set point), this also further trigger the performing of the step 218 at which the voltage ($V_b$) is determined to be greater than or equal to or less than the over voltage set point.

Figure 7:
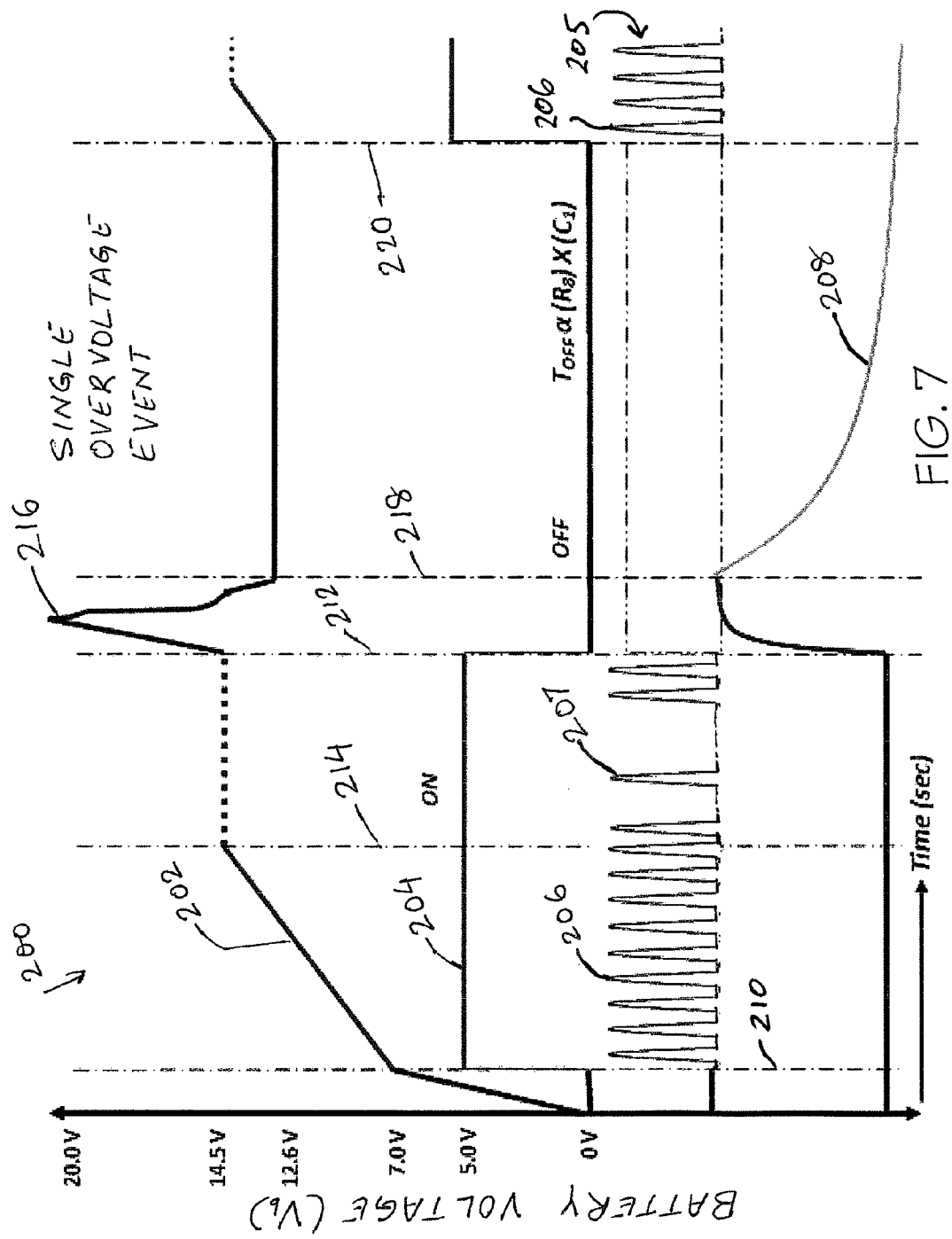
FIGS. 7-9 are timing diagrams further illustrating manners of operation of the additional circuitry of FIGS. 1-5 in relation to the alternator system, battery, and/or load.
Figure 8:
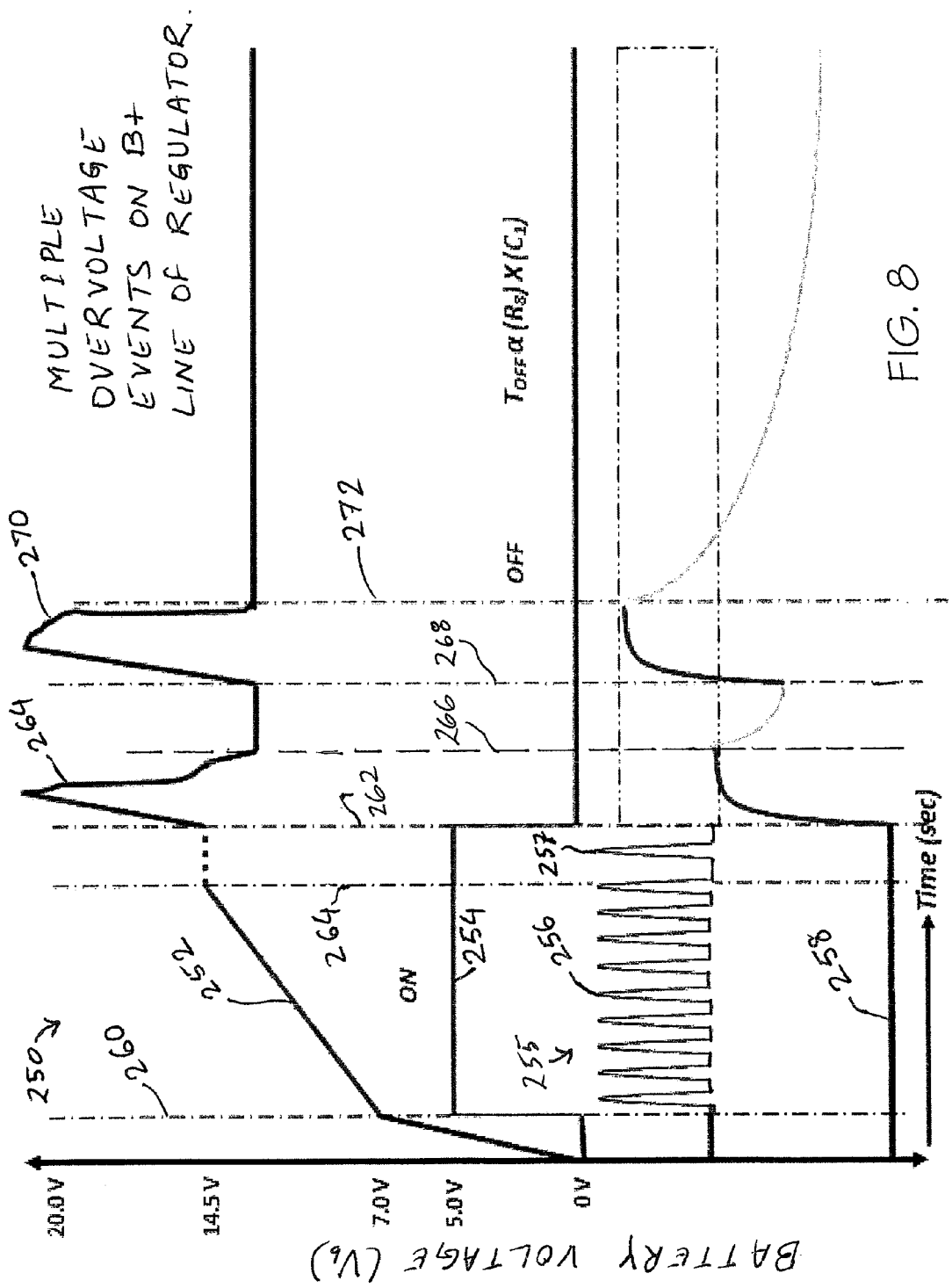

Turning to FIGS. 7 and 8 first and second timing diagrams 200 and 250 are shown, respectively. The timing diagram 200 of FIG. 7 illustrates example signals that can be experienced by the system 40 (and the additional circuitry 50), particularly during operation when a single overvoltage event occurs. By comparison, the timing diagram 250 of FIG. 8 shows example signals that can be experienced by the system 40 (and the additional circuitry 50) when multiple overvoltage events occur within relative rapidly succession such that the capacitor C1 has not fully discharged before the occurrence of a subsequent overvoltage event (in this instance, two such events are shown to occur). It should be understood that the signals shown in the timing diagrams 200 and 250 are merely intended to highlight or exemplify some operations of the system 40, but that the system 40 need not operate in accordance with these particular diagrams in any particular embodiment or at any particular circumstance.

With respect particularly to the timing diagram 200 of FIG. 7, in that timing diagram four curves. In the timing diagram 200, changes in time are represented along the x axis while values of the various curves at different times are shown to vary along the y axis. A first curve 202 of the timing diagram 200 particularly shows example voltage values at the battery terminal 56 (the battery voltage ($V_b$)) varying with time. The y axis of the timing diagram 200 particularly shows values of this voltage. In addition to the first curve 202, the timing diagram 200 additionally includes a second curve 204 that is representative of the charging control circuit status in terms of being ON or OFF. That is, the second curve 204 particularly relates to the ON/OFF status of the PNP transistor Q of the second functional unit 104, which governs operation of the third functional unit 106 and thus governs actuation of the SCR T1 of the first functional unit 102. A third curve 205 is representative of battery charging current that varies over time, that is, the current flowing through the SCR T1. Finally, a fourth curve 208 shows the voltage on (across) the capacitor C1 of the fourth functional unit 152.

FIG. 7 illustrates several operational characteristics of note. First, FIG. 7 illustrates normal charging operation of the system 40 (and additional circuitry 50) as occurs in the absence of overvoltage events. As shown, when the second functional unit 104 is in the ON mode of operation as indicated by the second curve 204 between a first time 210 and a second time 212, the battery voltage ($V_b$) represented by the first curve 202 increases steadily (or substantially steadily) up until a third time 214 (which in this example is about midway between the first and second times) at which the battery voltage attains a fully-charged level or set point (in this case, about 14.0 V+/−0.2 V). That is, the first curve 202 steadily increases in value while the second functional unit 104 is ON until the battery 60 is fully charged. However, during the time period between the third time 214 and the second time 212 when the second functional unit 104 remains on, during which the battery 60 is fully (or substantially fully) charged, as shown the battery voltage ($V_b$) does not increase but rather stays the same. That is, between the third and second times 214 and 212, the first curve 202 remains at a constant (or substantially constant) value.

The third curve 205 illustrates the corresponding battery charging current that flows during the time period between the first time 210 and the third time 214 and also between the third time 214 and the second time 212. As shown, between the first and third times 210 and 214, respectively, the battery charging current repeatedly shuts on and shuts off as represented by a series of periodic half-wave sinusoidal pulses 206, which correspond to positive (or alternatively negative) half cycles of the alternator system 22. The half-wave sinusoidal pulses 206 are shown to occur regularly during this time period between the first and third times 210 and 214, respectively, since during this time the battery 60 still needs to be charged to higher and higher voltages. However, following the third time 214 and up until the second time 212 at which the second functional unit 104 shuts OFF, the battery charging current is shown to encompass only a few pulses 207 that occur intermittently rather than regularly. This is because, during this period of time, the battery 60 is already fully (or substantially fully) charged and so further battery charge current only flows when the battery charge occasionally falls to a level slightly under its fully-charged level. Such operation, where battery charging current only occasionally flows in order to keep the battery 60 at its voltage set point, can be referred to as "trickle charging operation".

The timing diagram 200 further illustrates example operation of the system 40 (and additional circuitry 50) when an overvoltage event occurs. In the example shown, an overvoltage event occurs as represented by a spike 216 in the first curve 202 between the second time 212 and a fourth time 218. It is during this time period, between the second time 212 and the fourth time 218 that the fourth curve 208 experiences a significant rise as the capacitor C1 is charged up based upon the overvoltage event that has occurred. In the present example, the fourth time 218 is the time at which the overvoltage event ceases to occur. Following the fourth time 218, the capacitor C1 then discharges through the eighth resistor R8, as further represented by the diminishing value of the fourth curve 208 between the time 218 and a fifth time 220. The amount of time between the fourth time 218 and the fifth time 220 is directly proportional to the RC time constant established by the product of the resistance of the eighth resistor R8 and the capacitance of the capacitor C1. While this is occurring, the second functional unit 104 serving as the charging control circuit (or comparator unit) remains OFF, as represented by the second curve 204. Also during this time period between the fourth time 218 and the fifth time 220, the battery voltage ($V_b$) at the battery terminal 56 remains constant or flat as indicated by the first curve 202. More particularly, the battery voltage during this time period and as represented by the first curve 202 remains flat a level that is slightly lower than the voltage set point that existed prior to the occurrence of the spike 216. This is because, after the voltage spike 216, battery charging operation shuts down between the times 218 and 220 so the battery voltage drops down to a normally charged value of about 12.8 Volts.

Ultimately, the fifth time 220 is the time at which the capacitor C1 is sufficiently discharged that the overvoltage shutdown is ended and thus, as shown, at the fifth time 220 the second functional unit 104 again goes into ON mode. At this time (after the fifth time 220), charging operation resumes and battery voltage ($V_b$) rises back up to its set point (again in this case about 14+/−0.2 V, although in other embodiments this can vary significantly). Thus, beginning at the fifth time 220, the first curve 202 begins to increase again since the battery 60 is being charged. Also, since the second functional unit 104 is ON and since the battery is not fully charged, the third curve 205 again experiences a period of the periodic half-wave sinusoidal pulses 206.

Turning then to FIG. 8, the second timing diagram 250 illustrates additional example operation of the system 40 (and additional circuitry 50 thereof) that is similar to that of the first timing diagram 200 but is different insofar as the signals correspond to operation where there are two overvoltage events that occur in relatively rapid succession. Like the timing diagram 200, the timing diagram 250 shows first, second, third, and fourth curves 252, 254, 255, and 258, respectively, that are representative of the battery voltage ($V_b$) at the battery terminal 56, the operational ON/OFF status of the second functional unit 104, the battery charging current provided by the alternator system 22 and conducted by the SCR T1, and the voltage on the capacitor C1, respectively. Further as shown, in the timing diagram 250, the second functional unit 104 is in the ON state beginning at a first time 260 up to a second time 262 at which a first overvoltage event represented by a spike 264 occurs. Relatedly, the first curve 252 indicative of the battery voltage ($V_b$) increases following the first time 260, indicating that the battery 60 is being charged. The battery voltage ($V_b$) levels off and stops increasing at a third time 264, prior to the second time 262. Correspondingly, the third curve 255 includes periodic half-wave sinusoidal pulses 256 during the period when the battery is being charged between the first time 260 and third time 264, and that includes intermittent pulses 257 (one of which is shown) during the time period between the third time 264 and the second time 262 during which trickle charging operation occurs.

Once the first overvoltage event represented by the spike 264 begins to occur at the second time 262, the second curve 254 immediately switches such that the second functional unit 104 is in OFF mode. Additionally, the voltage on the capacitor C1 represented by the fourth curve 258 increases. In the example of FIG. 8, the first overvoltage event corresponding to the spike 264 is short in length and particularly ends at a fourth time 266, at which point the capacitor C1 stops being charged. Between the fourth time 266, and a fifth time 268, the capacitor C1 discharges via the eighth resistor R8. However, at no time during this time period does the second functional unit 104 switch back from the OFF state to the ON state, since at no time during this time period does the capacitor C1 discharge to a degree sufficient so that the N-Channel MOSFET Q4 stops conducting. Further, in contrast to the timing diagram 200, in the timing diagram 250 an additional or second overvoltage event occurs as represented by a spike 270, beginning at a fifth time 268 and ending at a sixth time 272.

As a result of this second overvoltage event, the voltage on the capacitor C1 as indicated by the fourth curve 258 again rises, this time to a higher level than was previously experienced at the fourth time 266. Again, when the second overvoltage event is concluded at the sixth time 272, the capacitor C1 again begins to discharge as represented by the diminishing value of the fourth curve 258 subsequent to that time period. Throughout this time, while the second overvoltage event is occurring and during the discharging time period thereafter, the second functional unit 104 remains in the OFF mode notwithstanding any concurrent positive half cycles that may be occuring in the alternating system 22, and consequently the battery voltage ($V_b$) represented by the first curve 252 remains flat (again at a level less than what was previously achieved prior to the second time 262). Although not shown, it will be understood that such status of the first and second curves 252 and 254 continues until the capacitor C1 is sufficiently discharged, in accordance with the RC time constant established by the resistance value of the eighth resistor R8 and the capacitance level of the capacitor C1 (that is, the off time is proportional to the product of that resistance and that capacitance). After that time, which is not shown in FIG. 8, the second curve 252 can return to ON status and charging of the battery 60 can again occur.

Figure 9:
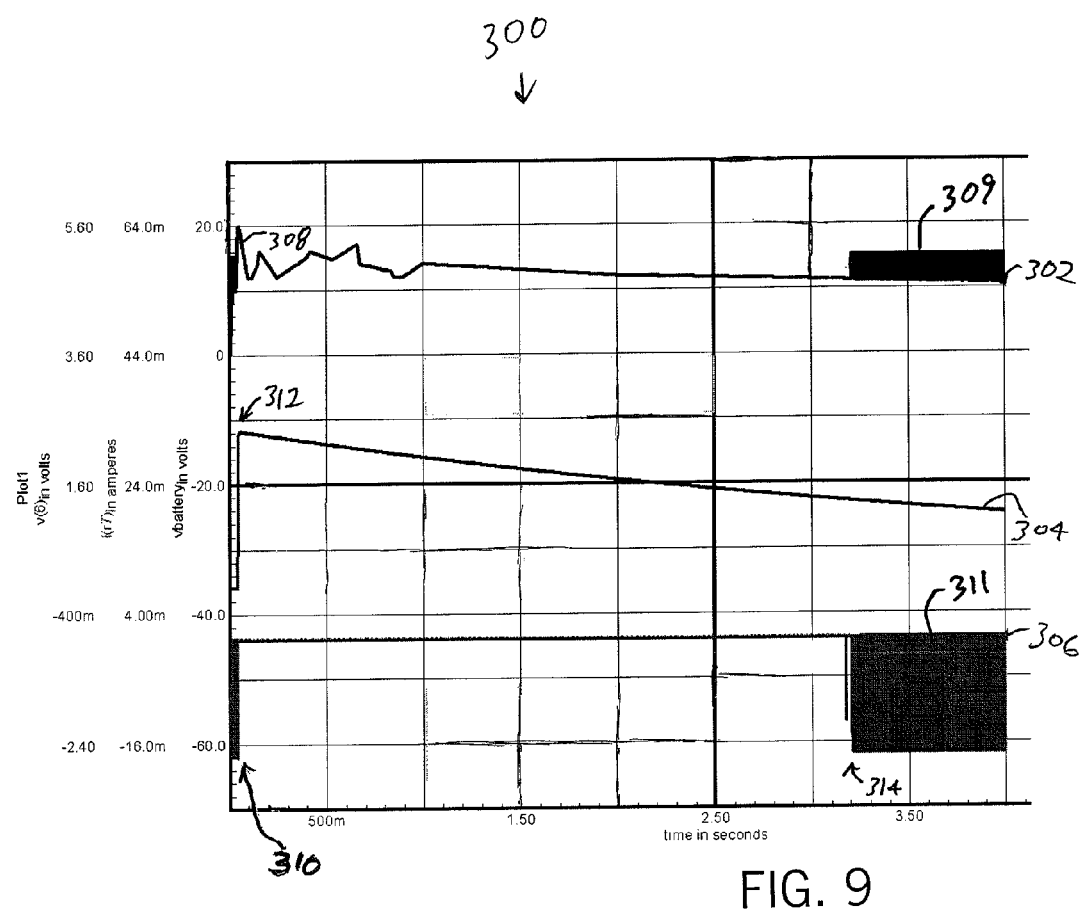

Turning to FIG. 9, a third timing diagram 300 is provided that shows additional example simulated behavior of the system 40 (and additional circuitry 50 thereof). In particular as shown, a first curve 302 shows example battery voltage (again, for example, the voltage ($V_b$) at the battery terminal 56), a second curve 304 shows example voltage across the capacitor C1, and a third curve 306 shows example current flow through the fifth resistor R5 of the third functional unit 106, all as a function of time. The current represented by the third curve 306 can also be considered the gate trigger current for the SCR T1 (which is also the current flowing through the resistor R5). The timing diagram 300 again illustrates example (in this case, simulated) operations that occur when an overvoltage event occurs as represented by a spike 308 in the first curve 302. As shown, the charging of the battery 60 by way of the SCR T1 stops instantly when the overvoltage event occurs as indicated at a location 310 on the third curve 306. Again, the third curve 306 can be considered to be representative of the current through the resistor R5, which is part of the third functional unit (SCR gate trigger unit) 106. Also, as shown, the second curve 304 increases significantly during the overvoltage event as the capacitor C1 is charged and then, at a time 312 at which the over voltage event is completed, the capacitor C1 then beings to discharge. Finally, at a time 314 at which the capacitor C1 has sufficiently discharged, normal charging resumes as indicated both by the first curve 302 and the third curve 306. In this example, normal charging resumes once the capacitor voltage drops below 1.8 Volts (as the MOSFET Q4 shuts OFF); nevertheless, the particular voltage level that need to be attained to allow normal charging to resume may vary depending upon the embodiment. Large darkened blocks 309 and 311 are then shown to occur (following the time at which the capacitor voltage falls below 1.8 V) at the end of the first curve 302 and the third curve 306, respectively, which represent actual battery charge current and SCR gate trigger current, respectively. The blocks 309, 311 appear as solid blocks due to the large number of charging current pulses and SCR gate trigger current pulses occurring during the time period shown in the graph.

From the above discussion, it should be apparent that in at least some embodiments the systems, circuitry, and/or methods described herein provide a smart and inexpensive battery charging system that can be used with engine driven alternators and that protects existing electrical and electronic components on the system power line (including but not limited to the battery itself) from overvoltage transients that can occur for any of a variety of reasons (e.g., due to the application of direct alternator voltage or from other external sources connected to the system, or for other reasons). In at least some such embodiments, this is achieved by turning OFF the battery charging control circuit and completely isolating the alternator from the charging system when an overvoltage surge is detected. Additionally, in at least some embodiments, following an overvoltage event the system further provides a predetermined time delay which can be adjusted based on application needs or operating conditions. Operation of this feature is such that the turning OFF of the battery charging control circuit/isolating of the alternator is only temporary; that is, this feature resets automatically such that the system resumes normal battery charging operation without any additional intervention. The system (particularly the overvoltage protection circuit) will continue to monitor for the next overvoltage pulse on the power line of the charging system after which, when identified, it causes a reset of the time delay. Additionally, the resetting of the time delay can occur even if the system never resumed normal battery operation subsequent to an earlier overvoltage event, for example, because an additional overvoltage event occurred before a previously-established time delay following earlier overvoltage event elapsed.

In at least some embodiments, the system includes an overvoltage protection or overvoltage shutdown circuit (e.g., corresponding to the fourth functional unit 152 discussed above) that controls a charging control circuit that controls a SCR governing the communicating of power from the alternator to the battery (and/or a load). In the event of an overvoltage condition, the overvoltage protection circuit turns OFF the charging control circuit by grounding the base of a comparator and switch transistor (e.g., the PNP transistor Q1) and thereby completely isolating the alternator from the charging system. As already noted, the overvoltage protection circuit also provides a time delay that can be predetermined and adjusted based on application needs, resets automatically to resume normal battery charging operation once the overvoltage signal is no longer active, and continues to monitor for the next overvoltage pulse on the power line of charging system after being reset. In at least some embodiments, the overvoltage protection circuit works directly with the low voltage and low current side of the rectifier regulator system. Hence it can provide relatively reliable control and protection against significant overvoltage spikes as compared to at least some conventional technologies in which excessive current and overheating of alternators are common side effects, and/or in which resetting of the system following an overvoltage event cannot occur without complete shutdown of the system.

In view of the above discussion, it should be appreciated that one or more embodiments of the system, circuitry, and/or methods disclosed herein can achieve one or more of a variety of advantages. For example, in at least some embodiments, the circuitry the additional circuitry 50) described herein can include or provide an overvoltage protection circuit (e.g., the fourth functional unit 152) that is suitable for use with half wave rectifier regulators and/or full wave rectifier regulators, and that shuts OFF battery charging operation by shutting down the SCR gate control circuit, thereby isolating the alternator terminals from the battery. Also for example, in at least some embodiments, the circuitry described, herein includes or provides an overvoltage protection circuit that further provides an automatic reset after the passing of a predetermined time delay and continues to monitor for any overvoltage events on an ongoing basis. Further, the control circuitry deals with the low voltage and low current side of the regulator system and hence provides more reliable control and protection against any significant overvoltage pulses. The ability to adjust the predetermined delay (e.g., by changing the resistance value of the resistor R1 and/or the capacitance value of the capacitor C1) allows for handling of known or likely conditions while still providing the essential battery charging signal for all or most other cases.

Also, advantageously, in at least some embodiments, the overvoltage circuit utilizes the unwanted overvoltage signal to charge a capacitor that is then employed to keep the control circuit OFF for a pre determined period of time (e.g., by way of a capacitor discharge cycle). Further, in at least some embodiments, the overvoltage circuit and/or the rectifier regulation circuit include and/or provide diagnostic indicators, one for normal operation of rectifier regulator and a second as an overvoltage shutdown indicator (e.g., the fifth and sixth functional units 154 and 156) via its integration into the overvoltage control circuit. Additionally in at least some embodiments, a gate trigger circuit is employed as part of/in conjunction with the rectifier regulator, where the silicon controlled rectifier has a biased gate using a RC filter to provide immunity from high frequency noise and to lower turn off time of controlled rectifier. This biasing provides ability to choose trigger frequency and adjust level of gate sensitivity.

Notwithstanding the above description, the present disclosure is intended to encompass additional circuits, systems, methods, and/or components or portions thereof in addition to or instead of those specifically described above. As already noted, depending upon the embodiment, the overvoltage protection systems encompassed herein can be modified to suit, and implemented in relation to, a variety of types of rectifier regulator/power regulator systems, including half wave and/ or a full wave rectifier regulator systems. Further, although the use of a N-Channel MOSFET device as described herein in the overvoltage protection system is advantageous in that the device can be actuated with only a minimal voltage trigger at its gate to turn ON and can drive high current through drain and source terminals, in other embodiments other MOSFETS or other voltage-controlled devices (or still other devices, including for example current-controlled devices) can be employed in the overvoltage protection system and/or to control the battery charge current control circuit. Additionally, although the use of a capacitor and resistor in the overvoltage protection system is advantageous in terms of determining a time delay for resetting of the system, particularly since charging and discharging of a capacitor in a controlled and protected manner can be effective in driving a device such as a MOSFET, in other embodiments other circuit component(s) or devices or methods can be employed, to achieve an appropriate time delay after which normal charging operation can be resumed. Also for example, the eighth resistor R8 can be replaced with a variable resistor by which an operator can vary the RC time constant governing the discharge of the capacitor C1 following an overvoltage event.

Further, although the MOSFET device and other circuit components of the overvoltage protection circuit described above can be used for shutting down the SCR gate control unit to stop the charging operation and electrically isolate the alternator in the event of an over voltage condition, in other alternate embodiments a variety of other techniques employing a variety of different analog and/or digital circuit components can be employed. indeed, in some such alternate embodiments, a digital control system (e.g., a computer, controller, microcontroller, microprocessor, and/or other digital control components such as programmable logic devices) can be employed in place of some or all of the circuit components constituting the overvoltage protection system and/or other portions of the additional circuitry 50 for achieving overvoltage protection and/or one or more of the other functions discussed above. However, the use of a digital control system (e.g., a microcontroller) can in some circumstances be less advantageous than circuit arrangements such as those described above, for example, since in some cases functional microcontrollers-based systems can themselves require additional signal processing circuit components and/or overvoltage protection circuit components as the digital control system devices can be sensitive to high voltage signals.

It is specifically intended that the present invention not be limited to the embodiments and illustrations contained herein, but include modified forms of those embodiments including portions of the embodiments and combinations of elements of different embodiments as come within the scope of the following claims.

We claim:

1. An electrical system for use with an alternator system that supplies electrical power, the electrical system comprising:
   a first circuit portion configured to govern whether the electrical power is communicated from the alternator system to a terminal associated with both of a battery and a load;
   a second circuit portion configured to determine whether a voltage is elevated above a predetermined threshold and to provide a first signal upon determining that the voltage is elevated above the predetermined threshold, wherein the voltage is either a first voltage at the terminal or a second voltage based at least indirectly upon the first voltage; and
   a third circuit portion coupled at least indirectly to each of the first and second circuit portions, wherein the third circuit portion includes at least one comparator circuit portion configured to make a determination as to whether an additional voltage is below or equal to a charge set point,
   wherein the third circuit portion is connected electrically at least indirectly in between the second and first circuit portions and configured to provide a second signal for receipt by the first circuit portion upon receiving the first signal from the second circuit portion,
   wherein the third circuit portion also is configured to provide the second signal for receipt by the first circuit portion upon the determination being made by the at least one comparator circuit portion that the additional voltage is not below or equal to the charge set point, and
   wherein the second signal is additionally configured to cause the first circuit portion to cease allowing communication of the electrical power to the terminal.

2. The electrical system of claim 1, wherein the first circuit portion includes a silicon-controlled rectifier or thyristor that can be switched to conductive and non-conductive operational states, and wherein the second circuit portion includes at least one first transistor-type device having a first operational status that is switched upon the determining that the voltage is elevated above the predetermined threshold.

3. The electrical system of claim 2, wherein the at least one first transistor-type device includes a voltage-controlled device and the first operational status of the voltage-controlled device is switched to a conductive status upon the determining that the voltage is above the predetermined threshold.

4. The electrical system of claim 2, wherein the third circuit portion includes at least one second transistor-type device, and wherein the at least one second transistor-type device has a second operational status that is switched when the first operational status of the at least one first transistor-type device is switched.

5. The electrical system of claim 4, wherein the at least one first transistor-type device includes a N-Channel metal-oxide semiconductor field-effect transistor (MOSFET), wherein the at least one second transistor-type device includes a first bipolar junction transistor (BJT), and wherein the second operational status is switched to a non-conductive status when the first operational status is switched to a conductive status.

6. The electrical system of claim 1, wherein one or more of the first circuit portion, the third circuit portion, and a fourth circuit portion are configured to operate to provide either half wave or full wave rectification of the electrical power and to communicate the electrical power as rectified to the terminal, in the absence of the voltage being elevated above the predetermined threshold and when the additional voltage based at least indirectly thereon is below or equal to the charge set point.

7. The electrical system of claim 1, wherein the second circuit portion is configured to operate so that, upon expiration of a predetermined time delay following a first overvoltage event, the first signal is returned to a normal operation level.

8. The electrical system of claim 7, wherein the second circuit portion includes a resistor and a capacitor, and the predetermined time delay is determined at least in part based upon a resistance value of the resistor and a capacitance value of the capacitor.

9. The electrical system of claim 8, wherein the capacitor is charged at least in part as a result of energy received due to the overvoltage event, and wherein the second circuit portion is configured to provide an automatic reset capability.

10. The electrical system of claim 7, wherein the second circuit portion is additionally configured to further defer returning of the first signal to the normal operation level by an amount of time equaling either the predetermined time delay or an additional predetermined time delay following an additional overvoltage event that occurs subsequent to the first overvoltage event but prior to the expiration of the predetermined time delay following the first overvoltage event.

11. The electrical system of claim 1, further comprising additional circuit components that provide diagnostic indicators, wherein the additional circuit components include a fourth circuit portion that is configured to output an indication as to whether the system is currently operating in a normal manner as a rectifier regulator, and further include a fifth circuit portion that is configured to output an additional indication as to whether the system is currently shut down due to an overvoltage event having occurred.

12. An internal combustion engine that includes the electrical system and the alternator system of claim 1, wherein the engine is either a small off-road engine or a non-road engine.

13. The electrical system of claim 1, wherein the electrical system is configured so that, when the voltage that is elevated above the predetermined threshold is provided from the alternator system or from one or more other external sources connected to the electrical system, the electrical system operates to protect one or more electrical components on a system power line by isolating the alternator system.

14. The electrical system of claim 1, wherein the second circuit portion includes a first Zener diode by which the voltage is determined to be elevated above the predetermined threshold.

15. The electrical system of claim 14, wherein the third circuit portion includes a second Zener diode by which the additional voltage based at least indirectly thereon is below or equal to the charge set point, wherein the third circuit portion includes a first BJT transistor coupled at least indirectly to the second Zener diode, and wherein the fourth circuit portion includes at least one additional BJT transistor and provides a trigger signal to the first circuit portion.

16. The electrical system of claim 15, wherein the second signal is provided at least indirectly from the first BJT transistor when the first BJT transistor ceases conducting, and wherein a fourth circuit portion includes a resistor and capacitor coupled in parallel that form a filter that serves to bias a gate of a silicon controlled rectifier of the first circuit portion.

17. A method of operating an electrical system of an engine having an alternator system that is configured to supply alternating current (AC) power to a remainder of the electrical system, the method comprising:
rectifying the AC power supplied by the alternator system and communicating the rectified AC power to a terminal at which are coupled both of a battery and a load, wherein the electrical system includes a silicon-controlled rectifier employed for performing the rectifying, and wherein the electrical system additionally includes a transistor device that at least indirectly influences operation of the silicon-controlled rectifier;
experiencing an overvoltage event at which a first voltage exceeds a threshold, wherein the first voltage is either a terminal voltage at the terminal or an other voltage based at least indirectly upon the terminal voltage;
causing the communicating of the rectified AC power to the terminal to cease, at least partly in response to the experiencing of the overvoltage event, wherein the electrical system is configured so that, when the first voltage exceeding the threshold is provided from the alternator system or from one or more other external sources connected to the electrical system, the electrical system operates to protect one or more electrical components on a system power line by isolating the alternator system;
charging a capacitor at least in part as a result of energy received due to the overvoltage event; and
delaying a reestablishment of the communicating of the rectified AC power to the terminal until at least a predetermined time period has elapsed since the overvoltage event, wherein the predetermined time period is based at least in part upon a resistance of a resistor and a capacitance of the capacitor that discharges through the resistor following a conclusion of the overvoltage event, wherein the reestablishment of the communicating of the rectified AC power occurs upon the capacitor being sufficiently discharged so as to result in a switching of a status of the transistor device, and
wherein, prior to the overvoltage event, the communicating of the rectified AC power additionally ceases during a time period in response to a second voltage exceeding a battery charge set point and subsequently is reestablished.

18. The method of claim 17, further comprising one or more of:
(a) filtering out signal components that can disrupt proper operation of the silicon controlled rectifier employed for performing the rectifying; and
(b) providing one or more indications of a status regarding one or both of (i) whether the communicating of the rectified AC power is proceeding normally, and (ii) whether the communicating of the rectified AC power has ceased due to the overvoltage event.

19. An electrical system for use with an alternator system that supplies electrical power, the electrical system comprising:
a first circuit portion configured to govern whether the electrical power is communicated from the alternator system to a terminal associated with both of a battery and a load;
a second circuit portion configured to determine whether a voltage is elevated above a predetermined threshold and to provide a first signal upon determining that the voltage is elevated above the predetermined threshold such that an overvoltage condition has occurred, wherein the voltage is either a first voltage at the terminal or a second voltage based at least indirectly upon the first voltage; and
a third circuit portion coupled at least indirectly to each of the first and second circuit portions, wherein the third circuit portion includes at least one comparator circuit portion configured to make a determination as to whether an additional voltage is below or equal to a charge set point,
wherein the third circuit portion is configured to provide a second signal for receipt by the first circuit portion upon receiving the first signal from the second circuit portion, wherein the third circuit portion also is configured to provide the second signal for receipt by the first circuit portion upon the determination being made by the at least one comparator circuit portion that the additional voltage is not below or equal to the charge set point,
wherein the second signal is additionally configured to cause the first circuit portion to cease allowing communication of the electrical power to the terminal, and
wherein the electrical system is configured so that, when the voltage that is elevated above the predetermined threshold is provided from the alternator system or from one or more other external sources connected to the electrical system, the electrical system operates to protect one or more electrical components on a system power line by isolating the alternator system.

20. The electrical system of claim 19, wherein the third circuit portion is connected electrically at least indirectly in between the second and first circuit portions, and wherein the second circuit portion includes a first Zener diode by which the voltage is determined to be elevated above the predetermined threshold.

* * * * *